United States Patent
Rai

(10) Patent No.: US 8,094,959 B2
(45) Date of Patent: Jan. 10, 2012

(54) EFFICIENT DETECTION OF CAMERA SHAKE

(75) Inventor: Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 986 days.

(21) Appl. No.: 12/030,964

(22) Filed: Feb. 14, 2008

(65) Prior Publication Data

US 2008/0144955 A1     Jun. 19, 2008

Related U.S. Application Data

(63) Continuation-in-part of application No. 11/299,218, filed on Dec. 9, 2005, now abandoned.

(51) Int. Cl.
    G06K 9/40     (2006.01)
    G03B 17/00    (2006.01)
    H04N 5/228    (2006.01)

(52) U.S. Cl. .................. 382/254; 396/52; 348/208.99

(58) Field of Classification Search .......... 382/173, 382/232, 254–255, 274–276, 284, 305, 312; 396/52; 348/208.4, 208.99
    See application file for complete search history.

(56) References Cited

U.S. PATENT DOCUMENTS

| | | | |
|---|---|---|---|
| 5,402,197 A | 3/1995 | Okano et al. | |
| 5,610,580 A | 3/1997 | Lai | |
| 5,794,081 A * | 8/1998 | Itoh et al. | 396/55 |
| 6,155,683 A | 12/2000 | Hanaki et al. | |
| 6,370,330 B2 | 4/2002 | Sekine et al. | |
| 6,625,319 B1 * | 9/2003 | Krishnamachari | 382/238 |
| 6,687,295 B1 * | 2/2004 | Webb et al. | 375/240.12 |
| 6,754,381 B2 | 6/2004 | Kuwata | |
| 6,834,162 B1 | 12/2004 | Schnell | |
| 6,922,524 B2 | 7/2005 | Sato | |
| 7,046,862 B2 * | 5/2006 | Ishizaka et al. | 382/298 |
| 7,352,812 B2 * | 4/2008 | Sun et al. | 375/240.16 |
| 7,362,918 B2 * | 4/2008 | Herley | 382/284 |
| 7,546,026 B2 * | 6/2009 | Pertsel et al. | 396/52 |
| 7,751,484 B2 * | 7/2010 | Jia et al. | 375/240.29 |
| 2003/0011709 A1 | 1/2003 | Kasahara et al. | |
| 2005/0146619 A1 | 7/2005 | Kobayashi et al. | |
| 2006/0017814 A1 | 1/2006 | Pinto et al. | |

\* cited by examiner

*Primary Examiner* — Kanjibhai Patel
(74) *Attorney, Agent, or Firm* — Mark P. Watson

(57) ABSTRACT

At least two sites in a frame of pixels are specified. The sites are arranged in a particular spatial distribution and correspond with the pixel locations of a block of pixels. Block parameters are calculated for each pixel block of first and second frames. The block parameters may be calculated using fewer than all of the bits of each pixel. A block-pair similarity determination for each pair of spatially-corresponding pixel blocks of the first and second frames is generated by determining whether there is a difference between the respective block parameters which is greater than a particular block-level threshold. A frame similarity determination is generated by combining the block-pair similarity determinations. A user-interface indication may be provided, or a frame may be stored, as a result of the frame similarity determination.

28 Claims, 11 Drawing Sheets

Landscape Mode

Portrait Mode

Rule of Three Mode

EFFICIENT DETECTION OF CAMERA SHAKE

CROSS REFERENCE TO RELATED APPLICATION

The subject application is a continuation-in-part of pending U.S. patent application Ser. No. 11/299,218 filed Dec. 9, 2005, which is incorporated by reference herein in its entirety.

FIELD

The present invention relates generally to digital image processing, and more specifically to capturing digital photographs.

BACKGROUND

Sometimes a photograph taken with a digital camera is blurred. One reason for this is camera shake. When taking a photograph with a camera held in one's hands, if the camera is not held sufficiently steady, the resulting image will be blurred. Of course, camera shake may be prevented by holding the camera stationary, but the length of time one must hold the camera steady varies, depending on the shutter speed used. In low light conditions longer exposure periods are needed to produce an image that is not too dark and, for this reason, the camera must be held stationary for relatively long periods under such conditions.

During the period when the photographer is viewing the scene and preparing to take a shot, he may at times hold the camera sufficiently steady to capture a shake-free image, while at other times he may not hold the camera steady enough. Different individuals have different abilities to hold a camera steady and a particular individual's ability may vary from time to time. In addition, the camera must be held steady for different periods, depending on light conditions. For these reasons, it can be difficult for the photographer to know when he is keeping the camera sufficiently stationary to capture a shake-free image.

One solution is a "trial and error" approach where the photographer repeatedly captures and, using human effort, inspects the captured image for blur until a shake-free image is obtained. Another solution is for the photographer to only take photographs at "safe" exposures, refraining from taking a photograph whenever the exposure period is longer than the safe period. These solutions are less than satisfactory. The first approach adds to the time and effort needed to a capture a photograph. Additionally, capturing multiple images consumes battery power. Moreover, because of the need to capture multiple images, the photographer loses control over the timing of when an image is captured, which can result in lost photo opportunities. The second approach also results in forgone photo opportunities.

Accordingly, there is a need for methods and apparatus for efficiently detecting camera shake when capturing digital photographs.

SUMMARY

Embodiments for efficiently detecting camera shake when capturing digital photographs are described. At least two sites in a frame of pixels are specified. The sites are arranged in a particular spatial distribution and each site corresponds with the pixel locations of a block of pixels. Each block has at least two pixels. A block parameter is calculated for each block of first and second frames in a sequence of frames. A block-pair similarity determination is generated for each pair of spatially-corresponding pixel blocks of the first and second frames. The block-pair similarity determinations are generated by determining whether there is a difference between the respective block parameters which is greater than a particular block-level threshold. Additionally, a frame similarity determination is generated by combining the block-pair similarity determinations.

Spatial distributions for the sites are described. In this regard, a frame may be divided into nine regions and sites are positioned with respect to the nine regions. Landscape, portrait, and rule-of-three modes of spatial distribution are disclosed.

Embodiments are described in which block parameters may be calculated using fewer than all of the bits of each pixel.

The frame similarity determination may be used to trigger the rendering of an indication corresponding with the frame similarity determination in a user-interface device, such as a display device or a speaker. The frame similarity determination may also be used to trigger the storing of the second frame or of a third frame in the sequence of frames in a nonvolatile memory if the frame similarity determination indicates that a shake-free image is probable.

Method, apparatus, and system embodiments are disclosed. As explained in the drawings and detailed description, it is not necessary that both the first and second frames be stored in a memory at the same time. Accordingly, the described embodiments reduce memory requirements, thereby reducing chip size and saving power. Additionally, the described embodiments provide for detecting camera shake in real-time.

This summary is provided to generally describe what follows in the drawings and detailed description. This summary may omit various important features and aspects pertinent to the claimed inventions that are described in the drawings and detailed description. Accordingly, this summary is not intended to limit the scope of the invention defined by the claims. Objects, features, and advantages of the invention will be readily understood upon consideration of the following detailed description taken in conjunction with the accompanying drawings.

BRIEF DESCRIPTION OF THE DRAWINGS

In the drawings and description below, the same reference numbers are used in the drawings and the description generally to refer to the same or like parts, elements, or steps.

DETAILED DESCRIPTION

Figure 2:
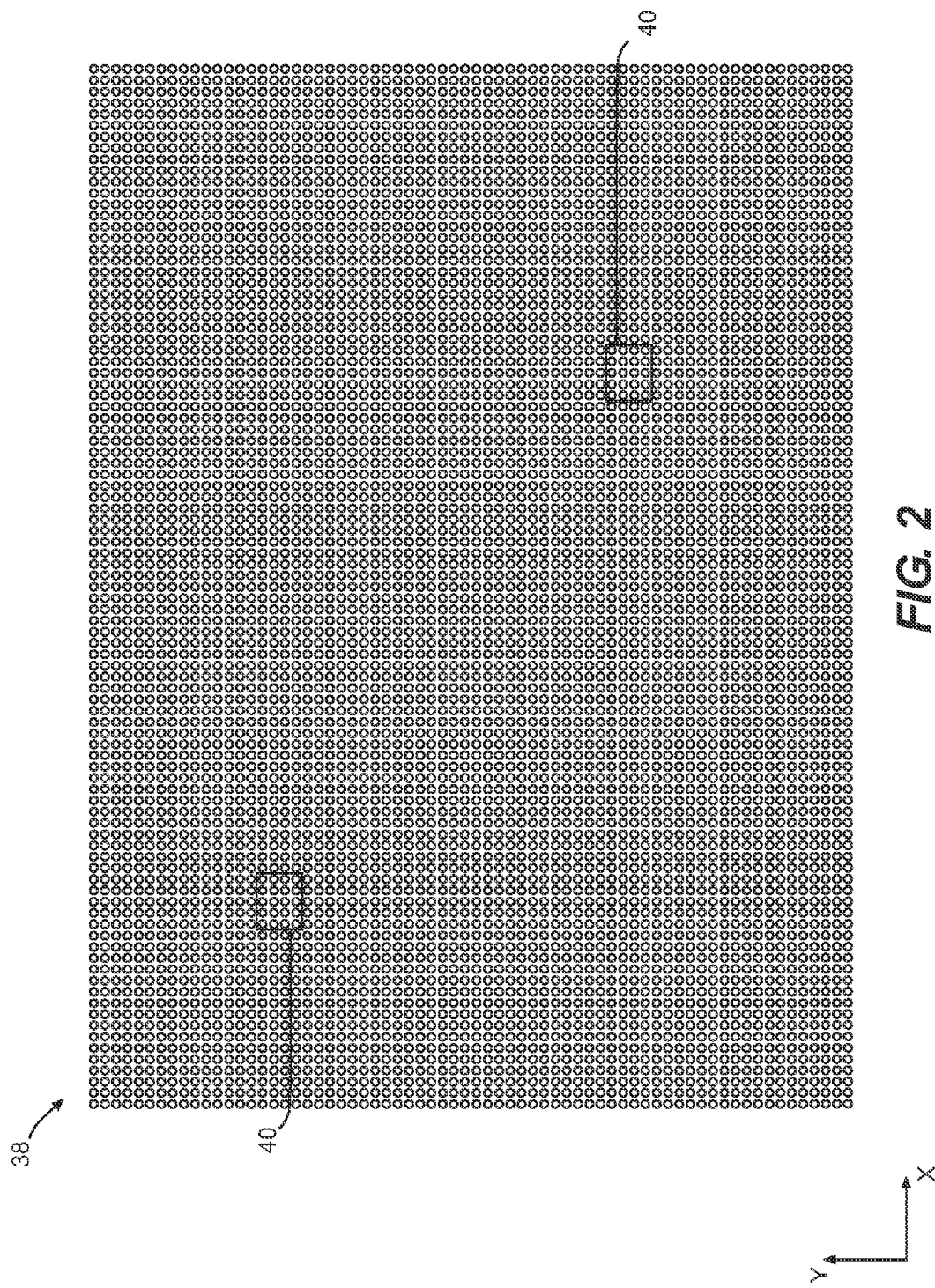
FIG. 2 illustrates an exemplary frame.

A digital image is formed from a two-dimensional array of small discrete elements ("pixels.") Digital images are often referred to as frames. A frame may be created in any resolution. For example, the resolutions of 640×480, 320×240 and 160×120 are illustrative. In one sense, the term "frame" may be used to refer to a data structure for holding pixels which is defined by the dimensions of the array. In this sense, a frame specifies a predetermined number of pixel locations. A frame having a resolution of 640×480, for example, specifies 307, 200 locations for individual pixels. Each pixel location is uniquely identifiable by its column and row (or alternatively, its x and y) coordinate position. FIG. 2 illustrates an exemplary frame, i.e., a two-dimensional array of pixel locations.

In another sense, the term "frame" may be used to refer to particular pixel data. The attributes of a pixel, such as its brightness and color, are represented by a numeric value, which is typically represented in binary form. This binary data may be any number of bits, typically ranging from one-bit-per-pixel up to 24-bits-per-pixel. The pixel data may be provided by a camera module, for example, and as such corresponds with a physical image. Thus, in this second sense, the term frame may refer to a plurality of pixels having particular data values, with the pixels populating particular pixel locations of a two-dimensional array. A digital photograph (or image) is such a frame of pixel data.

Figure 1:
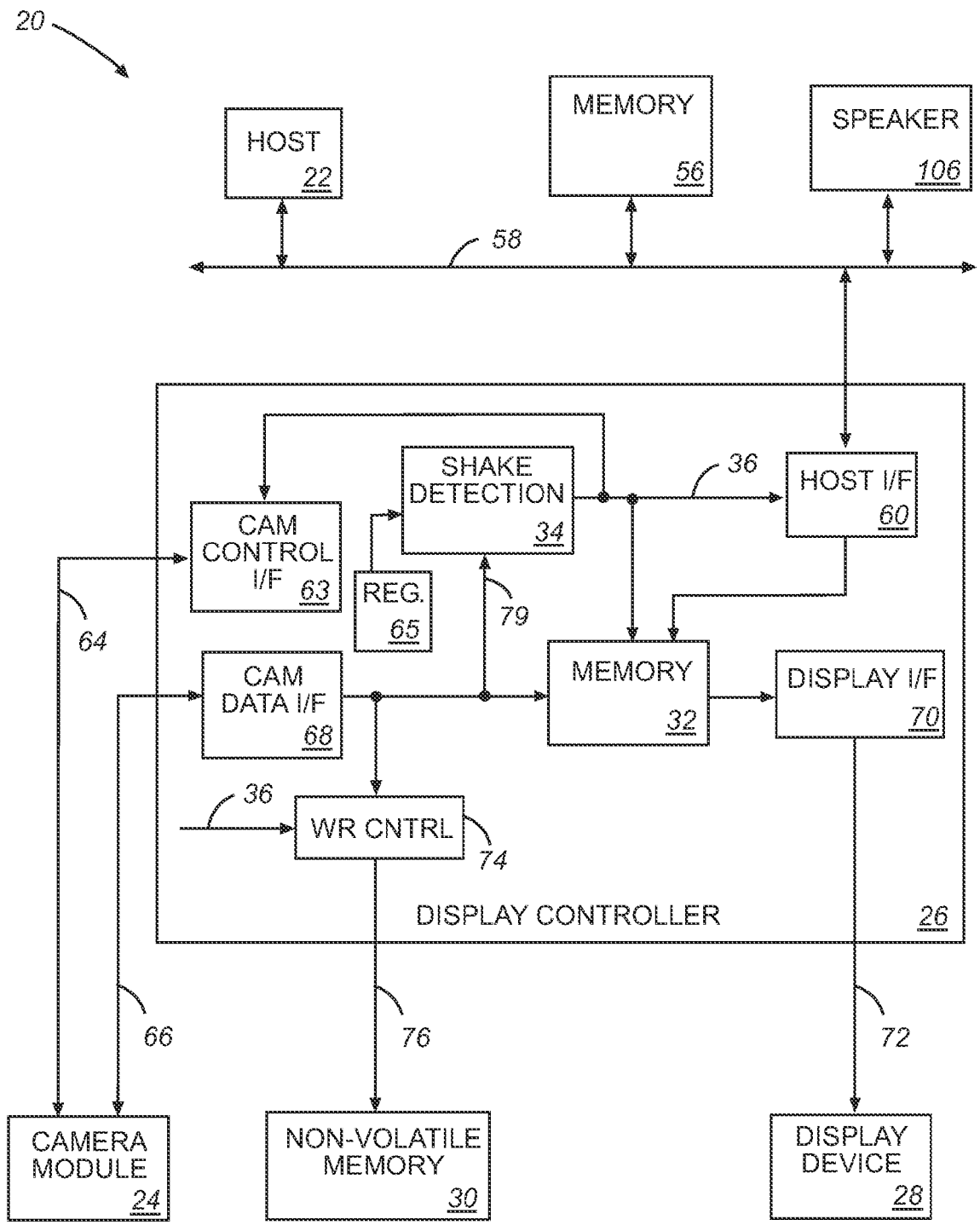
FIG. 1 is one embodiment of a system for efficient detection of camera shake.

Referring to FIG. 1, one embodiment of a system 20 for efficient detection of camera shake is shown. The system 20 includes a host 22, a camera module 24, a display controller 26, a display device 28, and a non-volatile memory 30. The display controller 26 includes a memory 32 and a shake detection module 34. The display controller 26 drives the display device 28 and interfaces the host 22 and the camera module 24 with the display device 28.

In one mode of operation, the camera module 24 may capture and output a stream of low-resolution frames. The stream of frames may be provided to the display controller 26, which buffers the frames in the memory 32 and optionally performs other processing on each frame. The frames are then transmitted to the display device 28 where they are rendered as a video image. The video image displayed on the display device 28 may serve as a viewfinder, permitting the photographer to frame and focus a potential photograph. When viewing the video, if the photographer wishes to take a picture, he depresses a "shutter button" (not shown), which causes the camera module 24 to capture and output a high-resolution frame. After the high-resolution frame is captured and output, it is stored in the non-volatile memory 30 as a digital photograph. It should be appreciated that it is not necessary to use the display device 28 as the viewfinder. In one alternative, the viewfinder may be comprised of optical elements, such as mirrors and lenses. The display device viewfinder may be used in inexpensive cameras while the optical viewfinder may be employed high-end cameras.

The shake detection module 34 compares two successive frames in the stream of frames output by the camera module 24. The camera module 24, in one embodiment, outputs frames at a rate of 15 frames per second, so that a first and a second frame in the stream may be within seven hundredths of a second of one another. The shake detection module 34 determines whether the first and second frames are similar. If the frames are similar, the shake detection module 34 asserts a signal on a line 36. On the other hand, if the two frames are not similar, the shake detection module 34 de-asserts the signal on line 36. The presence of an asserted signal on line 36 may be used to make an inference that it is probable that a shake-free image can be captured. Conversely, the absence of the signal on line 36 may be used to make an inference that it is probable that a blurred image will be captured. For convenience of explanation, the signal on line 36 may be referred to as a "blur-probable signal." Use of this blur-probable signal is described below.

The shake detection module 34 compares two successive frames in the stream of frames by comparing one or more specified pixel blocks of the frames. More particularly, the shake detection module 34 compares each specified pixel block of a first frame with a spatially corresponding pixel block of a second frame. The pixel blocks used for comparison purposes may be positioned at any desired site within a pixel array. In addition, any number of pixel blocks may be specified. However, I have discovered that when a particular number of pixel blocks are spatially distributed at particular sites in the array it is possible to determine if two frames are similar with increased efficiency. Specifically, the determination may be made by comparing only a small percentage of the total pixels of the frames. Exemplary spatial distributions of pixel blocks are described below.

In one embodiment, blocks of pixels are sampled from spatially-corresponding sites in first and second frames. As mentioned, each pixel location in an image is uniquely identifiable by its coordinate position. A block of pixels may include at least one pixel, and preferably includes at least two pixels. If the pixels of a first block in a first frame have the same coordinates as the pixels of a block in a second frame, then the first and second blocks of pixels may be considered spatially-corresponding. The pixels within each of the blocks may be summed, or alternatively, averaged. As a result of this summing or averaging calculation, a "block parameter" is produced for each of the pixel blocks. The block parameters for each pair of spatially-corresponding blocks of the first and second frames are then compared. Each such comparison results in a "block-pair similarity determination." For example, if the block parameters for a pair of blocks of the first and second frames are equal, then it may be inferred that the blocks are similar. On the other hand if the block parameters for the pair of blocks of the first and second frames are not equal, it may be inferred that the blocks are not similar. In one embodiment, the result of a block-pair similarity determination is a binary data element, i.e., a one or a zero, where one value corresponds with a determination of similarity, and the other value corresponds with a determination of dissimilarity. The block-pair similarity determinations are then combined to produce a "frame similarity determination." As one example of a frame similarity determination, if all of the block-pair similarity determinations for first and second frames indicate that the block pairs are similar, then it may be determined that the frames are similar.

When comparing block parameters, it is not critical that the block parameters be precisely equal. In one alternative, an inference may be made that a pair of blocks are similar if the respective block parameters are within a particular tolerance or threshold. As one example, assume a block-level threshold of 10. If the block parameters for a pair of blocks are 100 and 105, respectively, then the difference between the two parameters is 5, which is less than the assumed block-level threshold of 10. Accordingly, the block-pair similarity determination for these two blocks may be that the blocks are similar. Any block-level threshold may be selected.

Similarly, when comparing block-pair similarity determinations, it is not critical that all of the block-pair similarity determinations indicate that the block pairs are similar. In one alternative, an inference may be made that the first and second frames are similar if the number of block-pair similarity determinations that are similar exceed a frame-level tolerance or threshold. As one example, assume that the frame-level threshold is six. In addition, assume that if the block parameters for a pair of blocks are within the block-level threshold, the similarity determination for the pair equals one. Further, assume that there are nine pairs of pixel blocks, and that seven of the pairs of blocks are similar, i.e., the similarity determination for each of the seven pairs equals one. In this case, combining the block-pair similarity determinations produces the sum of seven. Because the frame similarity determination of seven is greater than the assumed frame-level threshold of six, it may be inferred that the first and second frames are similar. Any frame-level threshold may be selected.

It is not critical that the result of a block-pair similarity determination be a binary data element. In other words, it is not critical that the similarity parameters for pairs of spatially-corresponding blocks of the first and second frames only take the values of one or zero. In one embodiment, the block-pair similarity determinations may be weighted according to their spatial position in the pixel array. For instance, a first pair of pixel blocks situated at a first location may be assigned the value of two if similar, while a second pair of pixel blocks situated at a second location may be assigned the value of one if similar. Additional examples of weighting of the block-pair similarity determinations are provided below.

In one embodiment, when calculating block parameters, it is not essential that the entire pixel datum be used in calculating the sum (or average) of the pixels in a block. The shake detecting unit 34 may optionally include logic to select a particular bit of each sampled pixel, e.g., a $K^{th}$ bit. In this embodiment, instead of summing (or averaging) the entire data values of the pixels in a block, the block parameter is calculated by summing (or averaging) the $K^{th}$ bit values of the pixels in the block. Any bit position of a pixel may be selected as the $K^{th}$ bit. In one embodiment, the $K^{th}$ bit is the least significant bit ("LSB") of the pixel data value. As one example, bit position 24 of a 24-bit pixel may be selected as the $K^{th}$ bit. The bit that is selected as the $K^{th}$ bit determines the sensitivity of the method. By selecting one of the more significant bits, the sensitivity of may be increased. By summing just one bit of each pixel instead of the entire pixel, a smaller adder, comparator, and smaller registers for storing sums may be used than the adder, comparator, and registers required for summing (or averaging) entire pixel values. In one alternative, two or more, but fewer than all, of the bit positions may be selected for summing (or averaging). As one simple example, consider a block of four 8-bit pixels having data values of 11111111, 11001100, 10101010, and 11110000, respectively. The sum of the entire data values equals 1101100101, whereas the sum of the LSBs of respective of 1, 0, 0, and 0 equals 1.

In one embodiment, the blur-probable signal may be used to provide an indication to the photographer. The blur-probable signal may be used, for example, to provide a visual indication or an icon on a display screen of the display device. For instance, if the blur-probable signal indicates that it is probable that a blurred image will be captured, an icon may be displayed. On the other hand, if the blur-probable signal indicates that it is probable that a shake-free image may be captured, the icon may be removed from the display screen or modified. In addition to a visual indication, the blur-probable signal may be used to provide an audible indication to the photographer, which may be provided via a speaker.

In another embodiment, the blur-probable signal may be used to cause a digital photograph to be automatically captured. In this case, the blur-probable signal causes a frame output by the camera module 24, e.g., a "third" frame, to be stored in a nonvolatile memory 30. This third frame is a frame other than the two compared frames. In addition, the blur-probable signal may cause the camera module 24 to output a high-resolution frame for storage in the memory 30.

FIG. 2 illustrates an exemplary frame 38, i.e., a two-dimensional array of pixel locations, and two exemplary pixel blocks 40. The frame 38 is a 93×69 array of pixel locations, and the blocks 40 are 5×4 arrays of pixel locations. Typically, the frame 22 is larger than shown in FIG. 2. The blocks 40 may be larger, smaller, or the same size as depicted. Preferably, all of the blocks 40 are the same size, but this is not critical. The frame 38 includes 6,417 pixel locations and each block 40 includes 20 pixel locations. Thus, in this example, each block 40 is a 0.31 percent sample of the frame 38. In one embodiment, a frame (or array of pixel locations) has a resolution of 640×480 and each pixel block has a resolution of 32×32. Each block in this embodiment includes 1,024 pixel locations, which corresponds with a 0.33 percent sample of the frame's 307,200 pixel locations.

Figure 3A:
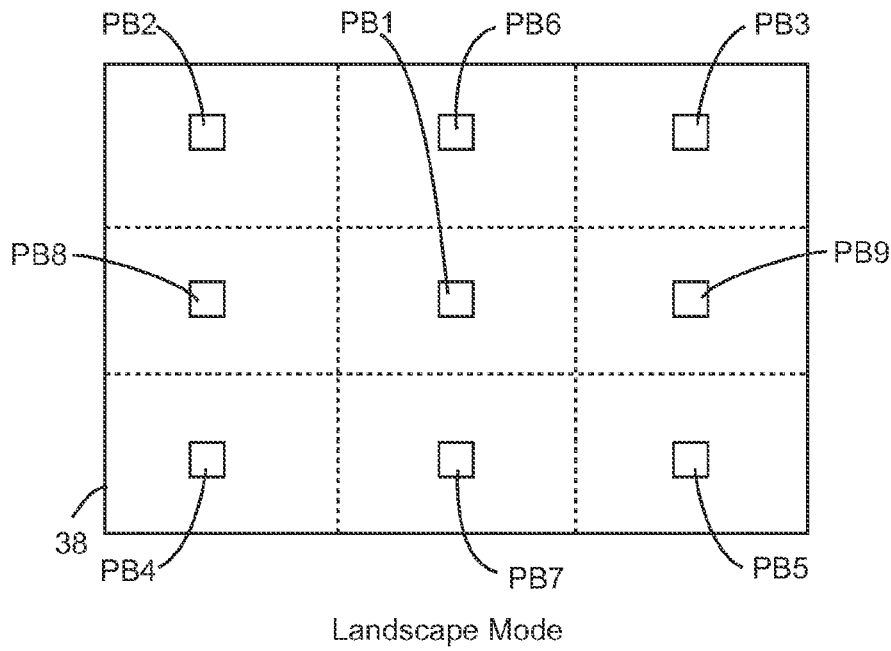
FIG. 3A illustrates first embodiment of a spatial distribution of pixel blocks.

FIG. 3A illustrates a first exemplary spatial distribution of pixel blocks in a frame 38 according to one embodiment of the present disclosure. The spatial distribution shown in FIG. 3A may be advantageous when capturing an image of a landscape. In FIG. 3A, nine regions of the two-dimensional array of pixel locations are specified by dividing the array into vertical and horizontal bands. The vertical bands may be of equal width and the horizontal bands may be of equal height. Each intersection of one of the vertical and one of the horizontal bands is specified as a region. As can be seen from FIG. 3A, in this embodiment the spatial distribution of nine pixel blocks PB1-PB9 situates one block at a site within each of the nine regions. These sites may be centered within the regions as shown, though this is not critical.

Figure 3B:
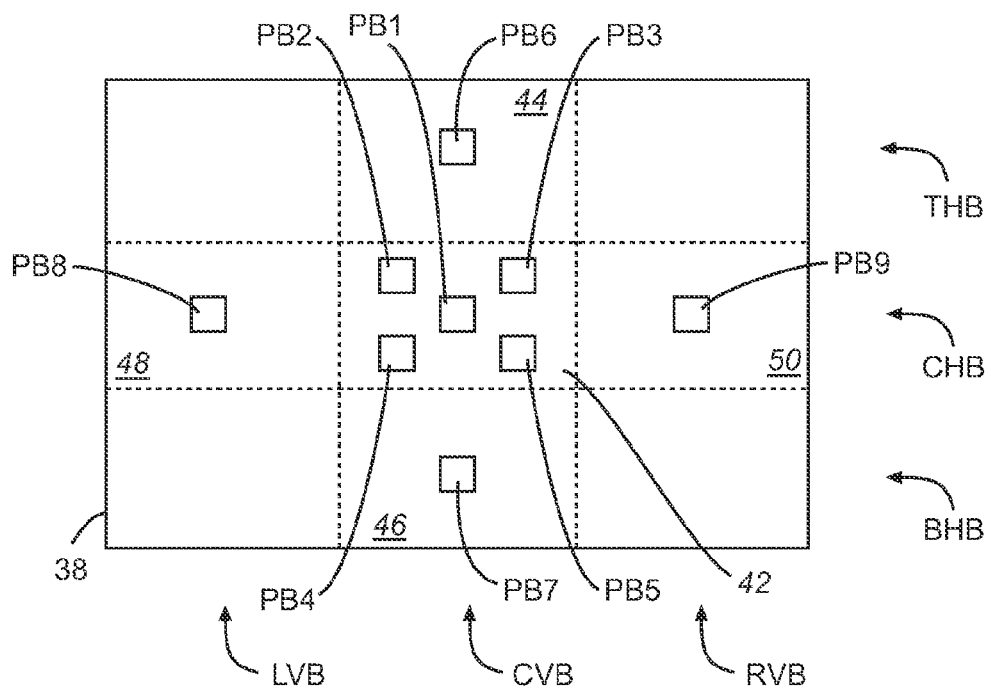
FIG. 3B illustrates second embodiment of a spatial distribution of pixel blocks.
Figure 3C:
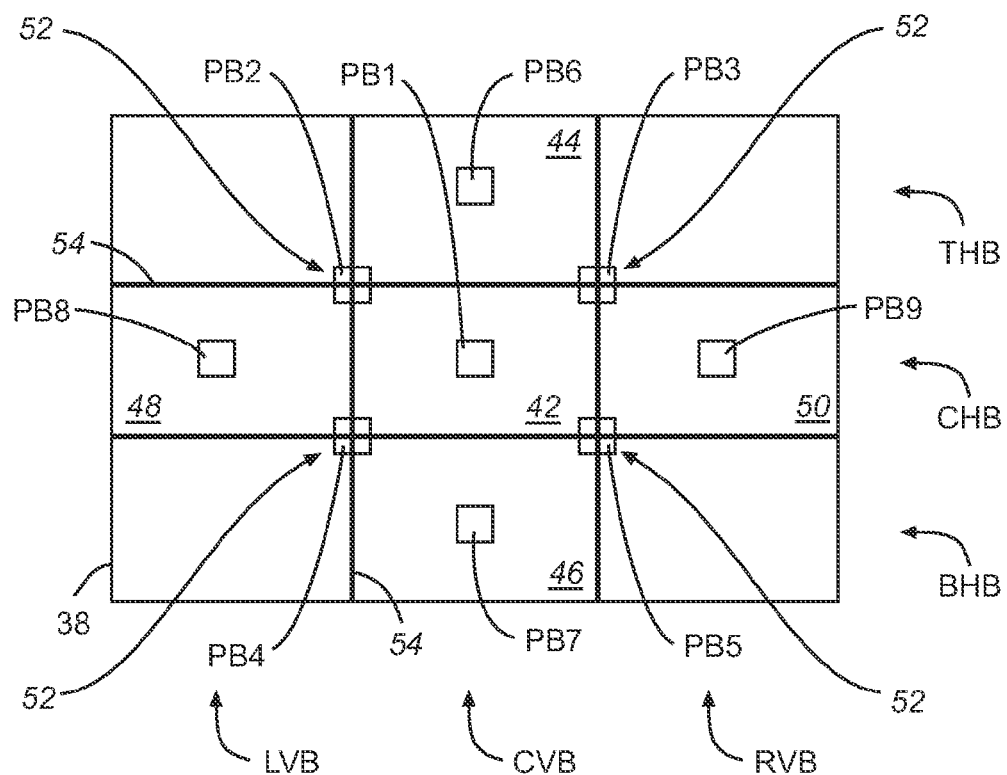
FIG. 3C illustrates third embodiment of a spatial distribution of pixel blocks.

FIGS. 3B and 3C illustrate second and third exemplary spatial distribution of pixel blocks in a frame 38. In FIGS. 3B, 3C, nine regions of the pixel array are specified by dividing the array into left, central, and right vertical bands (LVB, CVB, and RVB) and top, central, and bottom horizontal bands (THB, CHB, and BHB). Like FIG. 3A, the vertical bands may be of equal width and the horizontal bands may be of equal height. A center region 42 is specified at the intersection of the central vertical band CVB and the central horizontal band CHB. In addition, top-center and bottom-center regions 44, 46 are specified at the intersections of the central vertical band CVB and, respectively, the top and bottom horizontal bands THB, BHB. Further, left-center and right-center regions 48, 50 are specified at the intersections of the central horizontal band CHB and, respectively, the left and right vertical bands LVB, RVB.

In FIG. 3B, the spatial distribution of pixel blocks situates five sites (corresponding with PB1-PB5) in the center region 42, and one site (corresponding with PB6, PB7, PB8, and PB9, respectively) in each of the top-center, bottom-center, left-center, and right-center regions 44, 46, 48, and 50. While five sites are shown being situated in the center region 42, this is not critical though it is preferred that at least two sites are situated in the center region. The spatial distribution shown in FIG. 3B may be advantageous when capturing a portrait-type image.

In FIG. 3C, the spatial distribution of pixel blocks situates one site (corresponding with PB1, PB6, PB7, PB8, and PB9) in each of the center, top-center, bottom-center, left-center, and right-center regions 42, 44, 46, 48, and 50. While the sites in the center, top-center, bottom-center, left-center, and right-center regions are shown as being situated in the center of the respective regions, this is not critical. In addition, the shown spatial distribution situates pixel blocks at four additional sites (corresponding with PB2-PB5). These additional sites are centered at each four-corner junction 52 where corners of four regions meet. The spatial distribution shown in FIG. 3C may be advantageous when capturing an image in which a feature of interest is aligned with one of the corners where four of the regions meet. (Lines 54 used to form the vertical and horizontal bands may be visibly displayed in a view finder mechanism so that the photographer may align a feature of interest with one of the four-corner junctions 52.)

For convenience of explanation, the spatial distributions of pixel blocks described above may be referred to in this specification as "landscape" mode (FIG. 3A), "portrait" mode (FIG. 3A), and "rule-of-three" mode (FIG. 3C), respectively.

In the shown spatial distributions for landscape mode, portrait mode, and rule-of-three mode, nine blocks of pixels are specified. If the frame has a resolution of 640×480 and each pixel block has a resolution of 32×32, then each of the nine blocks includes 0.33 percent of the frame's pixel locations. Thus, approximately three percent of the pixels of the first and second frame are compared. By varying the resolution (size) of the pixel blocks, the percentage of pixels that are compared may be varied. Similarly, by varying the number of pixel blocks, the percentage of pixels that are compared may be varied.

As mentioned above, the similarity parameters for pairs of spatially-corresponding blocks of the first and second frames may take values other than one if the pair is similar. The block-pair similarity determinations may be weighted according to their spatial position in the pixel array. As an example of such weighting, each block-pair similarity determination may be equally weighted in the landscape mode. As another example, in the portrait mode, the block-pair similarity determinations for blocks in the center region may be weighted more heavily than the determinations for blocks situated at sites in the top-center, bottom-center, left-center, and right-center regions. In yet another example, in the rule-of-three mode, the block-pair similarity determinations for blocks (PB2-PB5) situated at sites centered on a four-corner junction 46 may be weighted more heavily than the determinations for blocks situated at sites in the center, top-center, bottom-center, left-center, and right-center regions.

As mentioned above, it is not essential that all of the blocks of pixels 34 be of the same size. In one embodiment, the pixel blocks (PB1-PB5) situated at sites in the center region 42 in portrait mode may be larger than the sites situated in each of the top-center, bottom-center, left-center, and right-center regions 44, 46, 48, and 50. In another embodiment, the pixel blocks (PB2-PB5) situated at sites centered on a four-corner junction 52 in the rule-of-three mode may be larger than the blocks situated at sites in the center, top-center, bottom-center, left-center, and right-center regions.

The spatial distribution of pixel blocks for landscape, portrait, rule-of-three, or other mode for a particular frame resolution may be stored in a memory. If the block-pair similarity determinations are weighted according to their spatial position, the weighting scheme may also be stored in a memory. In addition, the resolution of the pixel blocks, e.g., 32×32, for a particular frame resolution, e.g., 640×480, may be stored in a memory. For example, the distribution, weightings, and resolutions may be stored in dedicated registers 65. Alternatively, this information may be stored in the memory 32.

In one embodiment, the photographer may select one of the landscape, portrait, or rule-of-three modes for a particular shot. In an alternative embodiment, one of the landscape, portrait, or rule-of-three modes may be automatically selected for the photographer when he sets a focus setting for a particular shot.

Referring to FIG. 1, the host 22 may be a microprocessor, a DSP, computer, or any other type of device for controlling a system 20. The host 22 may control operations by executing instructions that are stored in or on machine-readable media. The system 20 may also include a memory 56, which may be an SRAM, DRAM, Flash, hard disk, optical disk, floppy disk, or any other type of memory. The host 22 may communicate with the display controller 26, the memory 56, and other system components over a bus 58. The bus 58 is coupled with a host interface 60 in the display controller 26.

The display controller 26 may be a separate integrated circuit from the remaining elements of the system 20, that is, the display controller may be "remote" from the host 22, camera module 24, and display device 28. The display device 28 may be an LCD, but any device capable of rendering pixel data in visually perceivable form may be employed. For example, the display device 28 may be a CRT, LED, OLED, or a plasma device.

The camera module 24 may be programmatically controlled through a camera control interface 63 ("CAM CNTRL I/F") in the display controller 26. A bus 64 couples the camera control interface 63 with the camera module 24. The bus 64 may be an inter-IC bus. The display controller 26 may receive vertical and horizontal synchronizing signals from the camera module 24 and provide a clocking signal to the camera module 24 for clocking pixel data out of the camera module via a bus 66. A camera data interface 68 ("CAM DATA I/F") is provided in the display controller 26 for receiving image data output on the bus 66 from the camera module 24. The bus 66 may be a parallel or serial bus.

The camera module 24 includes an image sensor (not shown). The image sensor may be a charge-coupled device, a complementary metal-oxide semiconductor device, or other type of sensor, which includes an array of sensor pixels. The camera module 24 may be programmed to set the length of time that each sensor pixel integrates light, i.e., an exposure period. During each exposure period the entire array of sensor pixels may be exposed to the subject to be imaged, resulting in the capture of the raw data needed for the creation of one frame. The camera module 24 may be capable of performing the various image processing operations necessary to create a frame from the raw data, such as white balance adjustment, color filter array interpolation (de-mosaicing), and gamma correction. The exposure of the sensor array and the processing to create pixels may be referred to as a "capture event." A capture event typically results in the creation of a full frame in a particular resolution, but may result in the creation of only pixels located within specified pixel blocks.

The camera module 24 may output (a) each frame that it captures to the display controller 26 in its entirety, or (b) only the pixels within specified pixel blocks. If the camera module transfers full frames, the resolution and exposure period of the frame may be programmed. If the camera module transfers pixel blocks, the size, number, and location of the pixel blocks, along with the exposure period, may be programmed. The rate at which the camera module 24 outputs full frames is referred to herein as the "frame transfer rate." The rate at which the camera module 24 outputs pixel blocks is referred to herein as the "pixel block transfer rate." The frame and pixel block transfer rates are distinct from the exposure period. One reason for this is that the time it takes to process and transfer the image data may be longer than the exposure period. The time difference between a transfer rate and an exposure period may be particularly large if the frame has a high resolution and the exposure period is short.

Figure 4A:
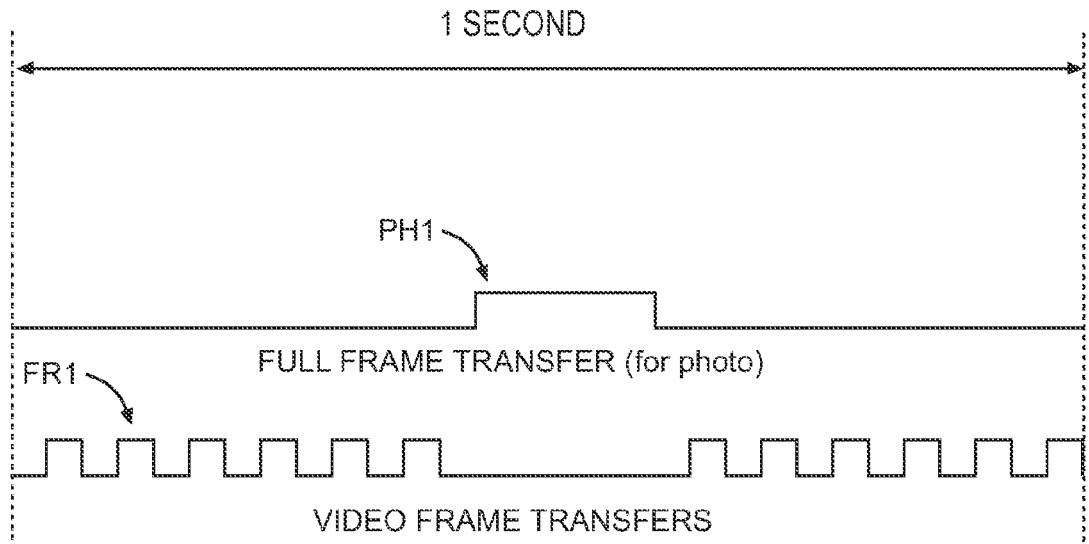
FIGS. 4A and 4B illustrate exemplary timing scenarios according to embodiments of the present disclosure.
Figure 4B:
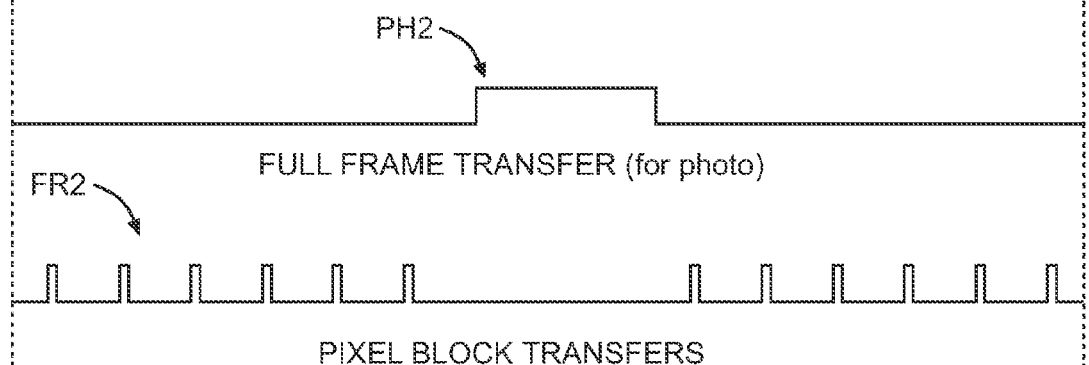

FIG. 4A illustrates a first exemplary timing scenario. In the first scenario, the camera module 24 outputs full frames for transfer to the display controller 26 at a first frame transfer rate FR1. On each rising edge of FR1, the camera module 24 outputs a video frame suitable for preview mode. On the rising edge of PH1, a frame suitable for digital photography is output, i.e., a "high" resolution frame. FIG. 4B illustrates a second exemplary timing scenario. In the second scenario, the camera module 24 outputs pixel blocks for transfer to the display controller 26 at a first pixel block transfer rate FR2. On each rising edge of FR2, the pixel blocks corresponding with one frame in a stream of frames are output. On the rising edge of PH2, a frame suitable for digital photography is output.

In order to capture a digital photograph that is not under or overexposed, a certain exposure period is required. The required exposure period depends on the particular lighting conditions and camera aperture. The required exposure period will, in many cases, be different from the exposure period used for capturing video frames or pixel blocks. For instance, for a video frame rate of 30 fps, the exposure period for each frame may be 1/30 sec. In contrast, the required exposure period for a photograph in low light may be 1/4 sec.

According to the principles of the present invention, an inference may be made that the camera is being held sufficiently still so that a shake-free image may be captured. The exposure period used for capturing video frames (or pixel blocks) and the time between capturing successive frames in comparison to the required exposure period for a photograph influences the degree of confidence in a prediction made in such an inference. Continuing the example, for a video frame rate of 30 fps, 7.5 frames, each having a 1/30 sec. exposure, are output by the camera module in a 1/4 of a second. Because the time difference between successive frames is smaller than the required exposure period, I have recognized that the degree of confidence that may be placed in a prediction that a shake-free image may be captured could be diminished.

In situations where there confidence of a prediction according to the principles of present invention may be reduced, several steps may be taken to increase confidence. First, the block-level threshold used in block-pair similarity determinations may be adjusted, e.g., reduced, and the frame level threshold used in frame similarity determinations may be adjusted, e.g., reduced. Additionally, both thresholds may be adjusted. Alternatively, the time period between the two frames (or sets of pixel blocks) to be compared may be increased. For instance, instead of comparing two successive frames, one or more frames may be skipped between the two frames that are compared. In addition, both the thresholds and the time between frames may be increased.

Because the time period between the two frames (or sets of pixel blocks) that are compared may be increased for the reasons described above, it should be understood that the term "second frame," as used in this description and in the claims, does not necessarily refer to the frame which is numerically second in a sequence of frames, i.e., the frame immediately following the first frame. The "second frame" simply means some other frame than the first frame. For example, when it is said herein that the shake detection module 34 determines whether the first and second frames are similar, the second frame may be the next frame in the sequence following the first frame, or the second frame may be some later frame in the sequence, e.g., the third, fifth, or fifteenth frame.

In one embodiment, the memory 32 serves as a frame buffer for storing image data. The memory 32 may be of the SRAM type, but the memory 32 may also be a DRAM, Flash memory, hard disk, optical disk, floppy disk, or any other type of memory. The memory 32 may receive a frame of image data that is ready for display, and thereafter the frame is fetched and transmitted to the display device 28. The display controller 26 includes a display device interface 70, and a frame of data for display is transmitted to the display device 28 via the display device interface 70 and a display device bus 72. The memory 32 may be relatively small, having a capacity to store only a single low-resolution frame. As one example, the memory 32 may have a capacity of 310 Kb for storing a 160×120 frame, where each pixel is represented by 16 bits. In an alternative embodiment, the memory 32 may have a capacity to store more than a single low-resolution frame, though it is generally desirable to keep the memory 32 as small as possible.

As mentioned above, the non-volatile memory 30 may be used to store digital photographs. The non-volatile memory 30 may be a Flash, hard disk, optical disk, floppy disk, magnetic tape, SD card, or any other type of memory capable of retaining information stored in the memory regardless of whether power is provided to the memory. The memory 30 is coupled with the output of the camera data interface 68 via a write control unit 74. The memory 30 may be separate from or embedded in the display controller 26. In one embodiment, the memory 30 may be coupled with the display controller 26 via a network, such as cellular telephone network or the internet, and image data is transmitted over the network to the memory 30.

It will be appreciated that the system 20 may include additional components. In addition, the display controller 26 may perform may include additional modules, units, or components. In order to not needlessly complicate the present disclosure, only modules, units, or components believed to be necessary for understanding the principles of the invention have been described.

Figure 5A:
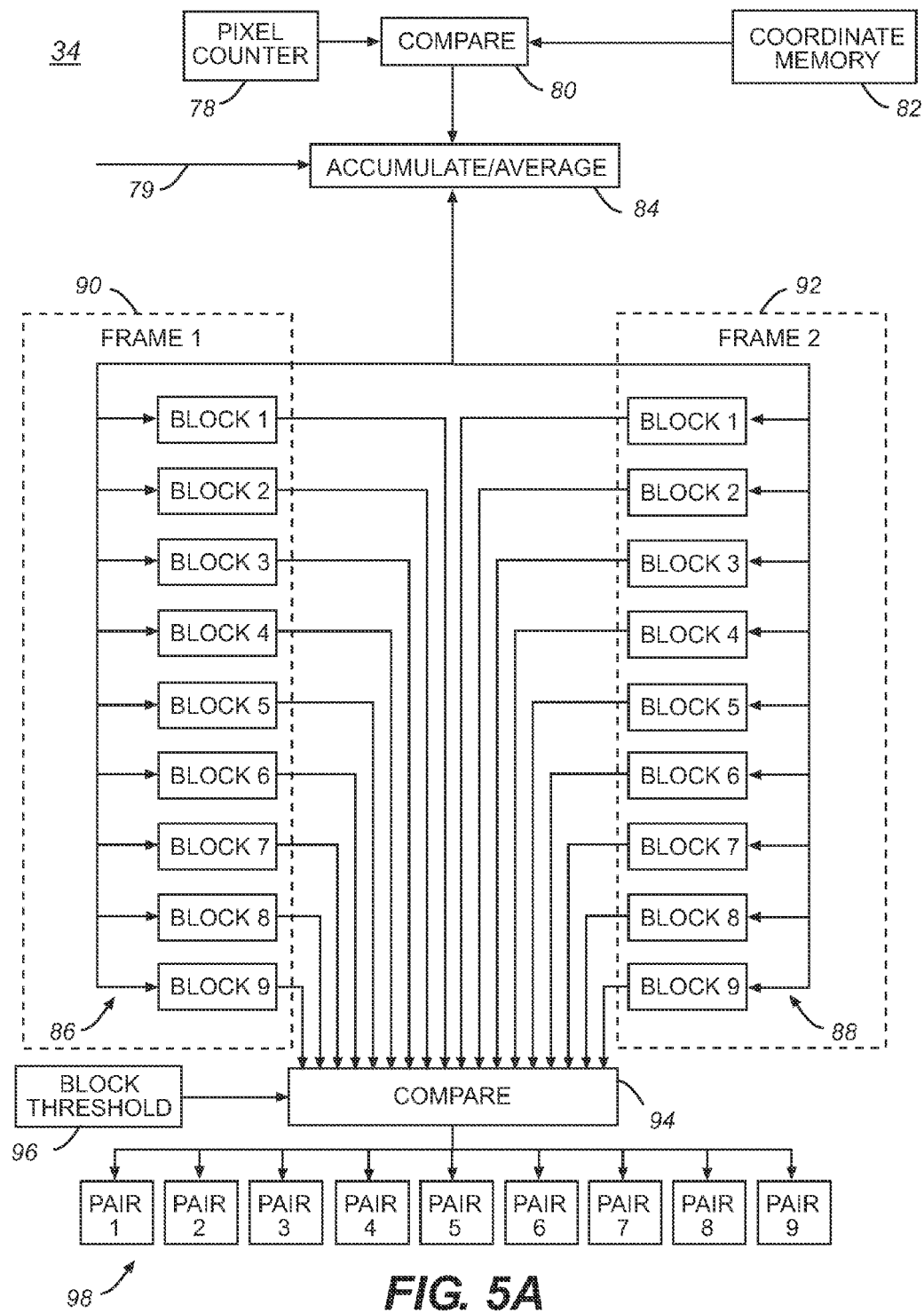
FIGS. 5A and 5B illustrate one embodiment of the shake detection module 34 in greater detail.
Figure 5B:
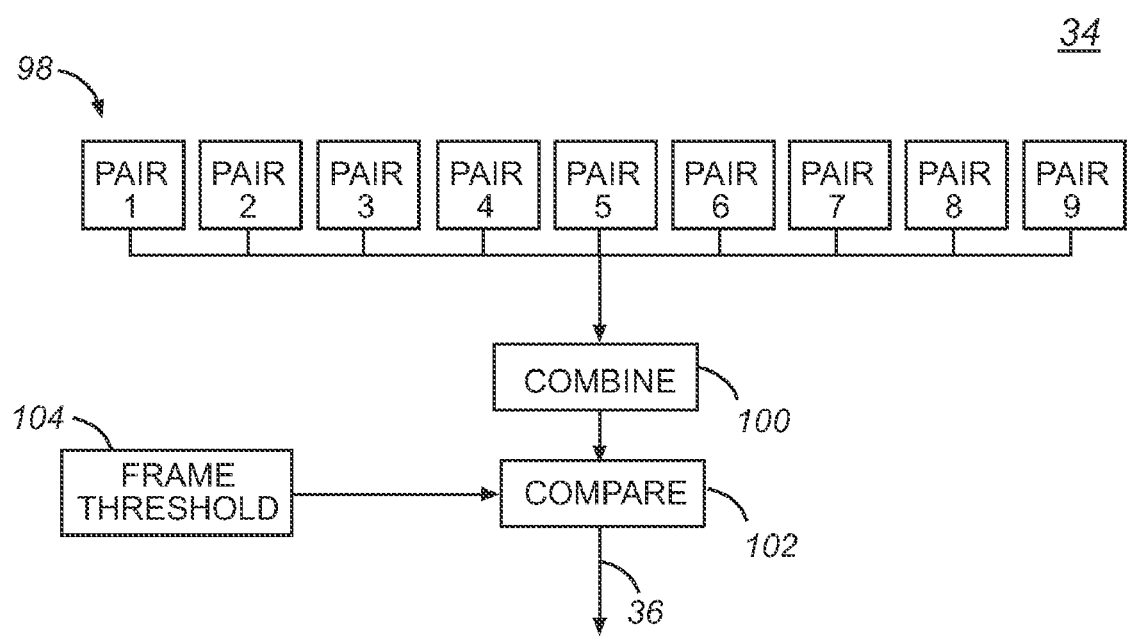

FIGS. 5A and 5B illustrate one embodiment of the shake detection module 34 in greater detail. Referring to FIG. 5A, a pixel counter 78 monitors pixel data transmitted on the bus 79 and provides coordinates of each pixel to compare unit 80. The coordinates of each pixel in one of the pixel blocks are stored in the coordinate memory 82. In one embodiment, nine pixel blocks are specified, and the coordinate location of each pixel in each of the nine blocks are stored in the coordinate memory 82. The coordinate memory 82 may be a set of registers. The compare unit 80 compares the pixel coordinates of the pixel currently on the bus 79 with the coordinate locations stored in the coordinate memory 82. Whenever the result of a comparison by the compare unit 80 indicates that a pixel currently on the bus 79 is a pixel within one of the pixel blocks, the compare unit 80 provides a signal to the accumulate unit 84, which causes the accumulate unit 84 to sample the pixel currently on the bus 36. The accumulate unit 84 uses the pixels sampled from the bus 79 in this manner to calculate block parameters for each specified pixel block.

The accumulate unit 84 may calculate a block parameter from the pixels of each block by summing the pixels in the block. In an alternative embodiment, the accumulate unit 84 calculates a block parameter by averaging the pixels in a block. Additionally, as described elsewhere, the accumulate unit 84 may calculate block parameters using fewer than all of the bits of each pixel in a block, e.g., using the $K^{th}$ bit of each pixel. The accumulate unit 84 may store each block parameter that it calculates in one of the registers 86, 88.

The registers 86 (enclosed by dashed line 90) are used for a first frame, while the registers 88 (enclosed by dashed line 92) are used for a second frame. Each register 86, 88 stores a block parameter for one block. In alternative embodiments, there may be more or fewer blocks 40 and accordingly more or fewer registers 86, 88 may be provided. Generally, for each register 86 there is a corresponding register 88. For example, the register 86 labeled "Block 1" corresponds with the register 88 labeled "Block 1." This pair of registers stores block parameters for spatially-corresponding blocks of first and second frames.

The registers 86, 88 are coupled with a compare unit 94. The compare unit 94 compares spatially-corresponding blocks to generate block-pair similarity determinations. For example, the compare unit 94 may compare a block parameter stored in the register 86 labeled "Block 1" with a block parameter stored in the register 88 labeled "Block 1." The compare unit 94 may subtract one block parameter from another, and compare the difference with zero. If the difference equals zero, then the compare unit 94 determines that the blocks are similar. Optionally, the compare unit 94 may compare the difference between two block parameters with a non-zero block threshold. With this option, after the compare unit 94 subtracts one block parameter from another, the difference is compared with the non-zero block threshold. If the difference is less than the non-zero block threshold, then the compare unit 94 determines that the blocks are similar. A block-level register 96 may be used to store a block-level threshold.

In one embodiment, the block-level threshold register 96 may be used to store two or more block-level thresholds. In this case, different block thresholds may be used for different pairs of spatially-corresponding blocks. The particular block-level threshold that is used may be a function of the location of the block in the frame. For example, the difference between "block 1" of the first frame and "block 1" of the second frame may be compared to a first threshold, while the difference between "block 2" of the first frame and "block 2" of the second frame may be compared to a second threshold. The "blocks 1," for example, may be in a central region and the "blocks 2" may be in a non-central region. In one embodiment, in portrait mode a first threshold for blocks PB1-PB5 in a central region is lower than a second threshold for blocks PB6-PB9 in non-central regions 38, 40, 42, and 44.

The compare unit 94 stores block-pair similarity determinations in the registers labeled "Pair 1," "Pair 2," "Pair 3," etc. indicated generally by arrow 98. In one embodiment, nine pixel blocks are specified, and accordingly nine registers 98 are provided. In alternative embodiments, more or fewer registers 98 may be provided. Each register 98 stores a similarity determination for one of the spatially-corresponding pairs of blocks of the first and second frames. In one embodiment, a block-pair similarity determination is a binary data element, i.e., 1 or 0. However, this is not critical. In another embodiment, block-pair similarity determinations may be weighted according to their spatial position in the pixel array.

Referring now to FIG. 5B, it can be seen that the registers 98 are coupled with a combine unit 100, which generates frame similarity determinations. The combine unit 100 may combine the block-pair similarity determinations for each of the spatially-corresponding pairs of pixel blocks by summing the respective block-pair determinations. In one alternative, the combine unit 100 may combine the block-pair similarity determinations by averaging the block-pair determinations. The combined similarity determination, i.e., the sum or average of the individual similarity determinations, is then compared by a compare unit 102 with a frame-level tolerance or threshold, which may be stored in a register 104. If the result of the comparison is that the combined similarity determinations are greater than the frame-level threshold, then it may be inferred that the frames are similar, and the blur-probable signal may be asserted on the line 36. If the combined similarity determination is less than (or equal to) the frame threshold, the blur-probable signal may be de-asserted.

It should be appreciated that the registers 65, 82, 86, 88, 96, 98, 104 and other similar registers needed to store calculation results or parameters may, in alternative embodiments, be any type of memory device. For example, in one embodiment, some or all of the registers 65, 82, 86, 88, 96, 98, 104 may be provided as memory locations in the memory 32. In another embodiment, some or all of the registers 65, 82, 86, 88, 96, 98, 104 may be provided as memory locations in the memory 56.

In one embodiment, the shake detection module 34 may perform some or all of the operations and methods described in this description by executing instructions that are stored in or on machine-readable media.

In one embodiment, different frame threshold values may be stored in the register 104 for different photographers.

Referring again to FIG. 1, it can be seen that the blur-probable signal on line 36 is provided to the memory 32, to the host interface 60, the camera control interface 63, and the write control unit 74.

In one embodiment, the blur-probable signal is used to provide a visual indication or an icon on the display device 28. As mentioned above, when the blur-probable signal is asserted, it is because first and second frames are similar, and it may be inferred that it is probable that a shake-free image can be captured. In one embodiment, when the blur-probable signal is asserted, the shake detection unit 34 may cause a portion of the frame stored in the memory 32 to be overwritten with a visual indication or icon indicating that it is probable that a shake-free frame may be captured. As a result of storing the visual indication in memory 32, the visual indication will be rendered on the display device 28. On the other hand, if the blur-probable signal is de-asserted, the visual indication or icon may be removed or modified. The shake detection unit 34 may accomplish this removal or modification by causing a portion of the frame stored in the memory 32 to be overwritten with a visual indication or icon indicating that it is probable that a blurred image will be captured. As mentioned the display device 28 may serve as a viewfinder for the photographer. In this way, the photographer may be alerted as to whether the capture of a shake-free image is probable. Where an optical viewfinder is provided, the display device 28 may be integrated with the optical viewfinder in a manner which provides for visually alerting the photographer of the status of the blur-probable signal.

In one alternative, the blur-probable signal may be provided to the host interface 60 which in turn provides a signal to the host 22. In this alternative, the host 22 rather than the shake detection unit may cause a visual indication, such as an icon indicating that the capture of a shake-free image is probable, to be rendered on a display device 28.

In one embodiment, the blur-probable signal may be used to provide an audible indication to the photographer. For example, the system 20 may include a speaker 106. Upon receipt of a signal from the host interface 60, the host 22 may cause an audible signal to be played on the speaker 106. Alternatively, logic within the display controller (not shown) may cause the speaker 106 to play the audible signal.

In another embodiment, the camera control interface 63, in response to receiving the blur-probable signal, programs the camera module 24 to output a third frame which may have a different resolution than the first and second frames. For example, if the first and second frames are low-resolution video frames, assertion of the blur-probable signal may cause the camera module 24 to output a third high-resolution frame.

Similarly, if the blur-probable signal is asserted based on the comparison of first and second sets of pixels block, the signal may cause the camera module 24 to output a high-resolution frame suitable for digital photography.

In yet another embodiment, the blur-probable signal may be provided to the write control unit 74. In response to receiving the blur-probable signal, the write control unit 74 causes a frame to be stored in the non-volatile memory 30. For example, the camera module 24 may output a third high-resolution frame in response to receiving the blur-probable signal. The write control unit 74 may cause this third frame to be stored in the non-volatile memory 30.

Figure 6:
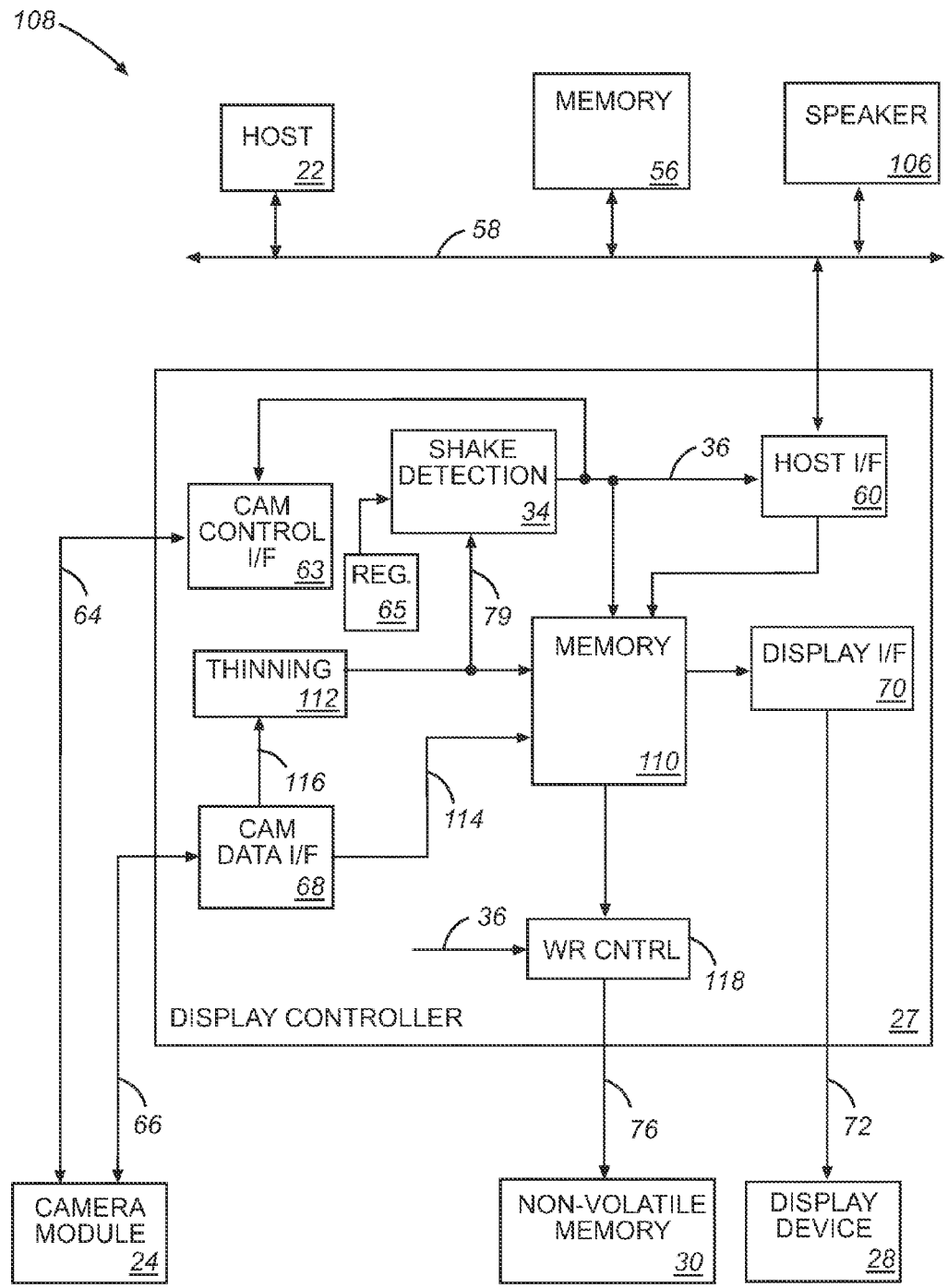
FIG. 6 is an alternative system for efficient detection of camera shake according to one embodiment of the present disclosure.

The blur-probable signal may also be used to automatically capture a digital photograph in an alternative system 108 shown in FIG. 6. The system 108 is similar to the system 20 described above. However, the system 108 is provided with a display controller 27 having a memory 110 in lieu of the memory 32. The memory 110 differs from the memory 32 in that it has the capacity to store both at least one low-resolution frame for use in driving the display device 28, and at least one high-resolution frame. The system 108 also differs from the system 20 in that the display controller 27 may include an optional thinning unit 112.

In operation, the camera module 24 outputs high-resolution frames on the bus 66. The camera data interface unit 68 provides one copy of the high-resolution frames to the memory 110 via a bus 114. As each successive frame in a stream of frames are provided, the previously stored high-resolution frame is overwritten in the memory 10. The camera data interface unit 68 also provides a copy of the high-resolution frames to the thinning unit 112 via a bus 116. The thinning unit 112 reduces the resolution of each high-resolution frame so that it is of a resolution suitable for display on the display device 28. The thinning unit 112 writes the reduced-resolution frames to the memory 110 where they are temporarily buffered before display. If an optical viewfinder is employed, the thinning unit 112 may not be needed.

Assertion of the blur-probable signal causes the write control module 118 to copy a high resolution frame stored in the memory 110 to the non-volatile memory 30. The frame which is copied to the memory 30 may be one of the two frames used in the block comparison. Specifically, the "second" frame may be copied to the non-volatile memory 30 as a digital photograph, which is in contrast to the system 20 which stores a third frame in the non-volatile memory 30 as a digital photograph.

Figure 7A:
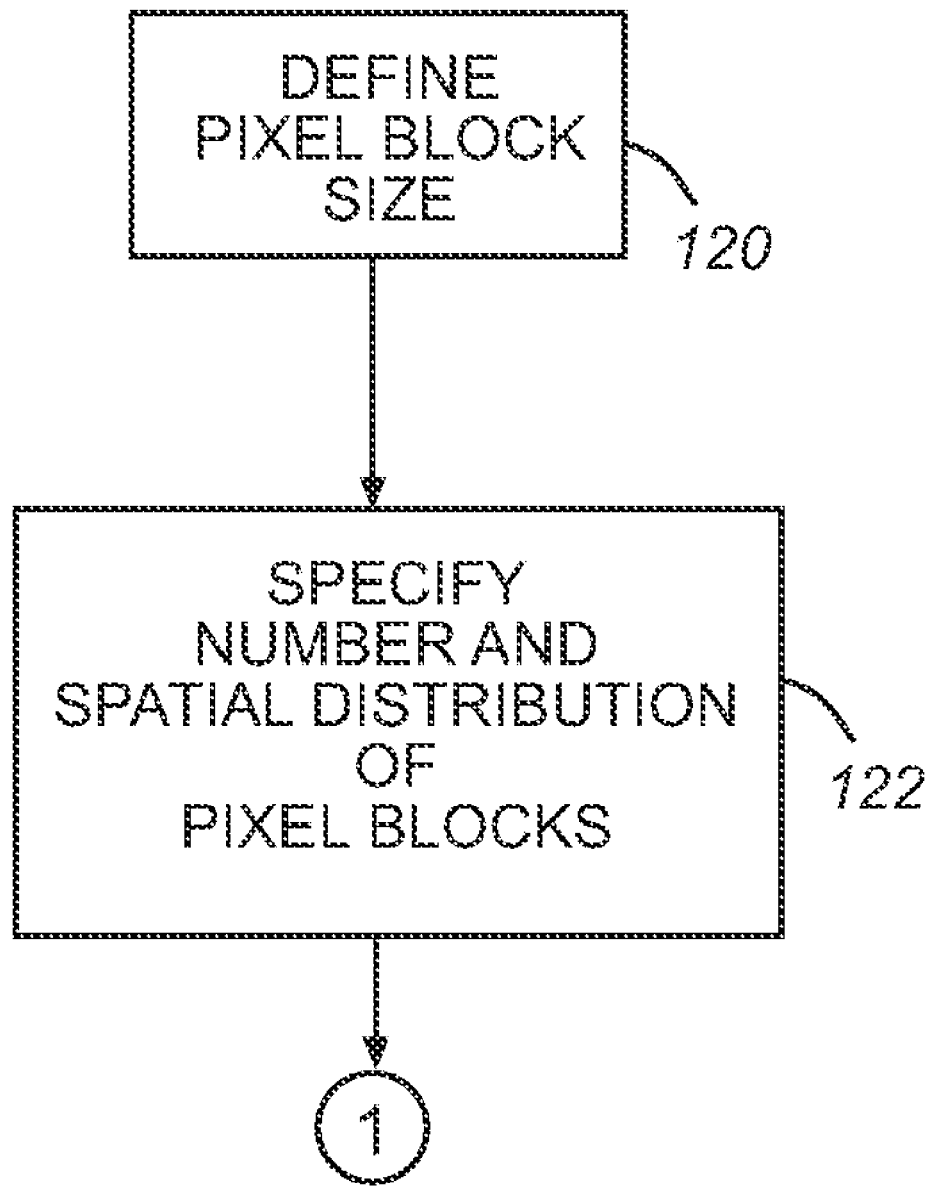
FIGS. 7A, 7B, and 7C illustrate one embodiment of a method.
Figure 7B:
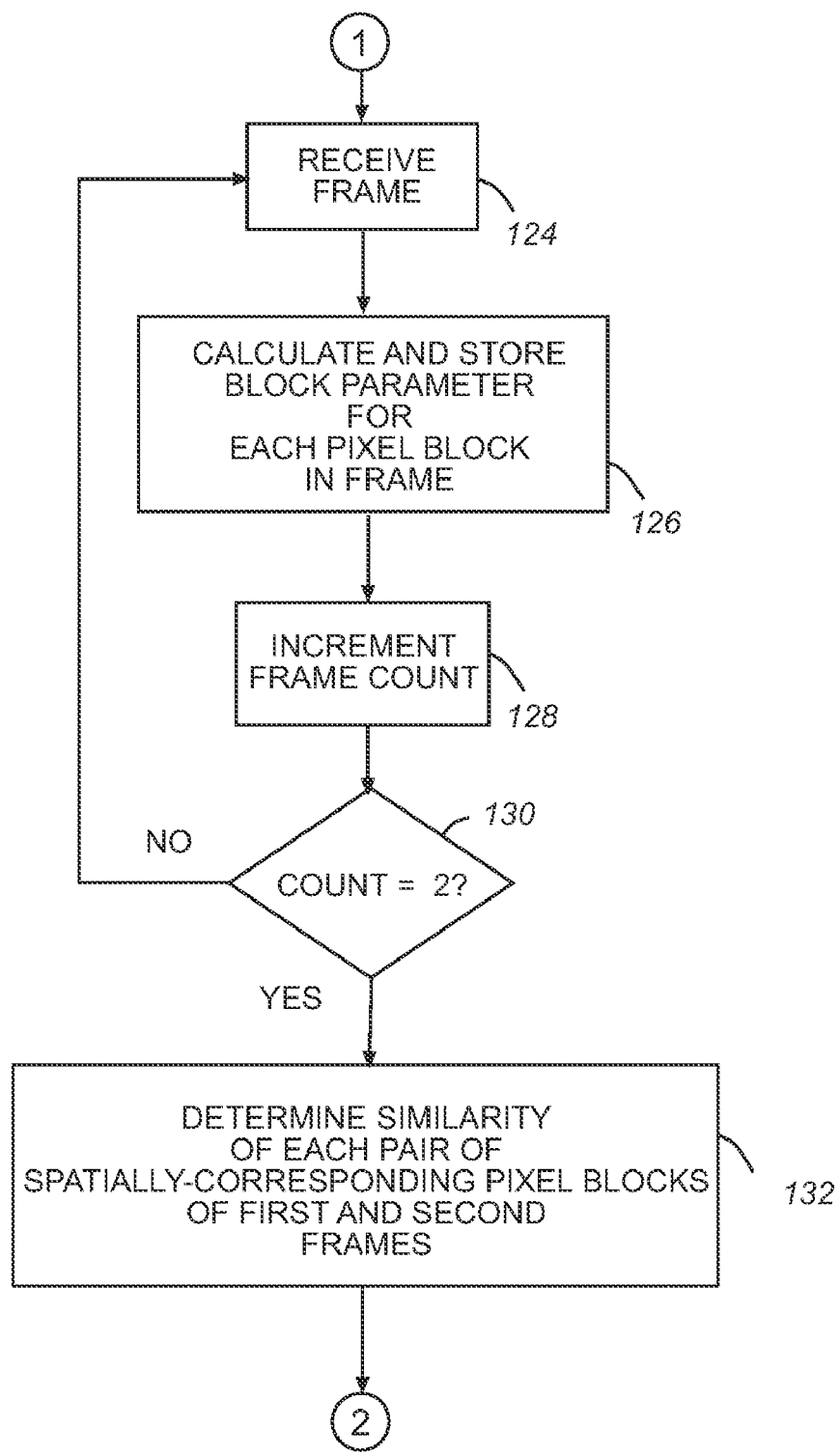
Figure 7C:
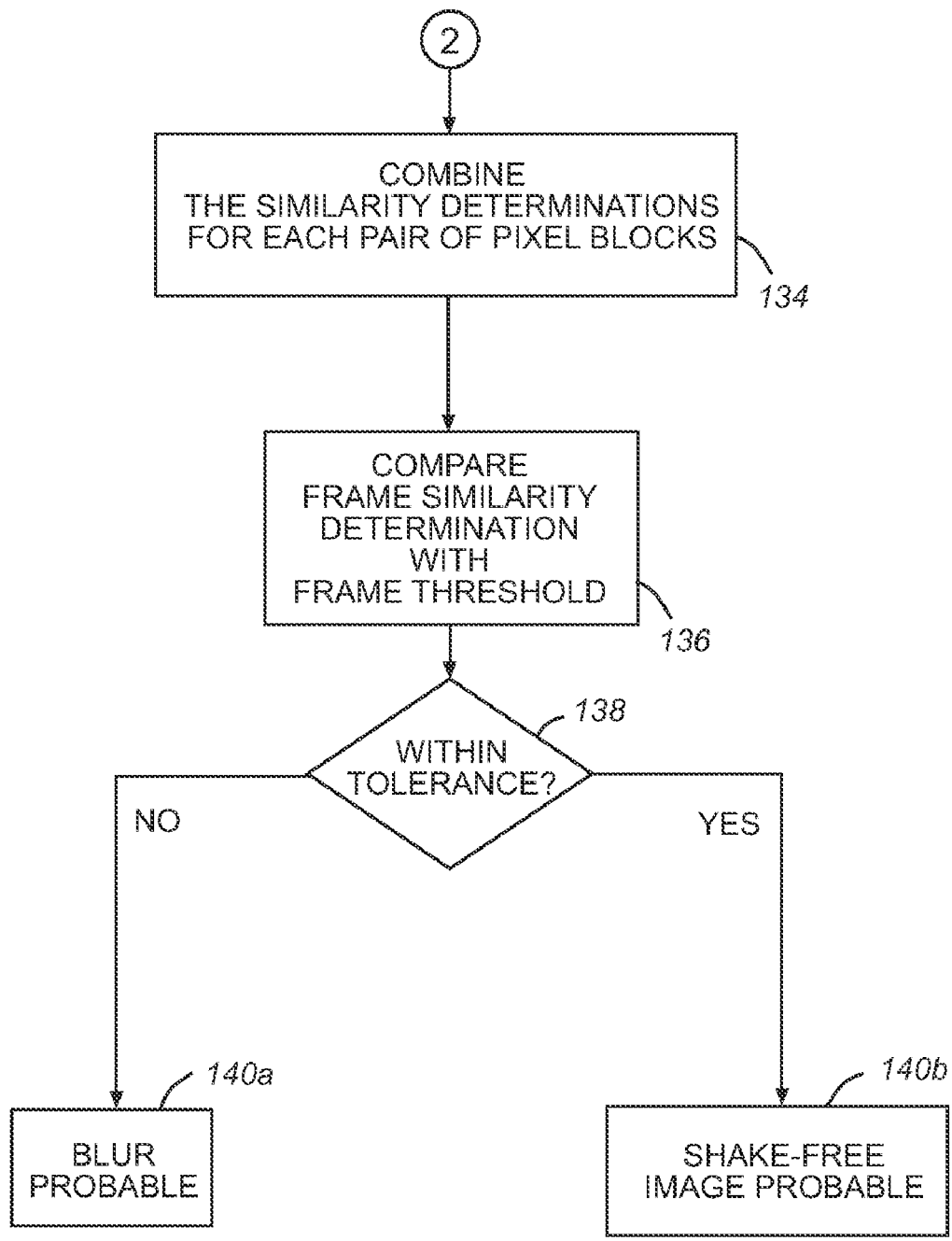

FIGS. 7A, 7B, and 7C illustrate a method according to one embodiment of the present disclosure. Referring first to FIG. 7A, the method includes a step 120 of defining resolution for a set of pixel blocks. The pixel blocks may be any desired size. Preferably, all of the pixel blocks are the same size, but this is not critical. In addition, the first method includes a step 122 of specifying a particular number of pixel blocks and the spatial distribution for the pixel blocks. In this step 122, a spatial distribution associated with the landscape, portrait, or rule-of-three modes may be specified.

Referring to FIG. 7B, a frame of pixel data is received (step 124). The frame is preferably received pixel-by-pixel in a particular order, e.g., raster order. As each pixel of the frame is received, it is determined whether the location of the pixel is within one of the specified pixel blocks (step 126). For pixels identified as being within a pixel block, the data value for the pixel may be added to a running total for the corresponding pixel block. A running total may be maintained for each pixel block in the frame. When the entire frame has been received, the respective running totals will represent the sum of pixel values in each of the pixel blocks specified for the frame. The stored sums may be used as the block parameters. Alternatively, the stored sums may be used to calculate an average of the pixel values, which may then be used as block parameters. In either case, a block parameter is stored in memory for each block of the current frame.

In one alternative, a set of pixel blocks corresponding with a particular capture event is received in step 124. In this alternative, it is not necessary to determine whether the location of the pixel is within one of the specified pixel blocks in step 126.

In one embodiment, when calculating block parameters, it is not essential that the entire pixel datum be used in the calculating the sum (or average) of the pixels in a block. The step 126 may optionally include selecting a particular bit of each sampled pixel, e.g., the $K^{th}$ bit. In this embodiment, instead of summing (or averaging) the data values of the pixels in a block, the block parameter is calculated by summing (or averaging) the $K^{th}$ bit values of the pixels in the block. Any bit position of a pixel may be selected as the $K^{th}$ bit. In one embodiment, the $K^{th}$ bit is the LSB of the pixel data value.

A frame count is incremented in step 128 and a test is performed in step 130 to determine whether two frames have been received. If it is determined that just one frame has been received, the method returns to step 124 and step 126 is repeated for a subsequent frame. When the entire subsequent frame has been received, block parameters will have been calculated and stored in a memory for each of the blocks of the subsequent frame. In step 128, the frame count is again incremented and the method returns to step 130. If it is determined in step 130 that two frames have been received, the method proceeds to step 132.

In step 132, it is determined, for each pair of spatially-corresponding pixel blocks of the first and second frames, if the two blocks are similar. The determination may be made on the basis of whether the sum (or average) of the pixel values of spatially-corresponding pixel blocks are equal. Alternatively, the determination may be made on the basis of whether the sum (or average) of the pixel values of spatially-corresponding pixel blocks are within a block-level threshold. All pairs of blocks that are determined to be similar may be assigned the same value. Alternatively, pairs of blocks that are determined to be similar may be assigned a weighted value, where the weight is a function of the location of the block in the frame. At the conclusion of step 132, a similarity determination will have been produced for each pair of spatially-corresponding blocks. The step 132 may include storing each of the block-pair similarity determinations in a memory.

Referring to FIG. 7C, in a step 134 the similarity determinations for each pair of spatially-corresponding pixel blocks of the two frames are combined. The pairs may be combined by summing or by averaging the individual block-pair similarity determinations. The result of the frame similarity determination produced in step 134 may be compared with a frame threshold in steps 136, 138. It may be inferred that the first and second frames are similar if the frame similarity determination is within the frame threshold. On the other hand, it may be inferred that the first and second frames are not similar if the frame similarity determination is not within the frame threshold.

If it is inferred that the first and second frames are similar, a signal or an indication may be provided that it is probable that a shake-free image may be captured (step 140b). For example, a blur-probable signal may be asserted. If it is inferred that the first and second frames are not similar, a signal or an indication that it is probable that a blurred image may be captured may be produced (step 140*a*). For example, the blur-probable signal may be de-asserted.

The blur-probable signal produced by the method shown in FIGS. 7A-7C may be used to provide a visual indication or an icon on a display device. If the blur-probable signal indicates that it is probable that a blurred image may be captured, a visual indication may be displayed. On the other hand, if the blur-probable signal indicates that it is probable that a shake-free image may be captured, the visual indication may be removed or modified. In addition, the blur-probable signal produced by the method shown in FIGS. 7A-7C may be used to provide an audible indication to the photographer.

Further, the blur-probable signal produced by the method shown in FIGS. 7A-7C may be used to cause a third frame in the stream of frames to be automatically captured. In addition, the blur-probable signal may cause a frame to be stored in a memory. Moreover, the blur-probable signal produced by the method shown in FIGS. 7A-7C may be used to cause a second frame in the stream of frames to be copied from a first memory to a second memory, e.g., to a non-volatile memory.

As described above, the camera module 24 may output only the pixels within the specified pixel blocks. One of ordinary skill in the art of camera modules will appreciate that this function may be implemented in several ways. For example, a pixel counter similar to pixel counter 78 may be provided in the camera module 24 to monitor pixel data to be output. A compare unit and a coordinate memory similar to the compare unit 80 and coordinate memory 82 may be provided in the camera module 24 to compare coordinates of each pixel to be output with the coordinates of pixels within specified blocks. Output of all pixels other than pixels located within specified blocks may then be suppressed. As another example, appropriate logic may be provided in the camera module 24 so that only the raw data needed to form pixels located within specified blocks is read out of the image sensor. Once the necessary raw data is read out and processed, pixels located within specified blocks may be output from the camera module 24.

Methods, apparatus, and systems for efficient detection of camera shake have been described, for the most part, with respect to implementations in display controllers 26, 27. In one embodiment, all or part of the described methods and apparatus may be provided within the camera module 24. In these embodiments, the camera module 24 may additionally output the blur-probable signal, which may be provided to the host interface 60 or the write control module 36. Alternatively, the camera module 24 may route the blur-probable signal for internal use, such as for capturing and outputting a high-resolution frame. Additionally, the camera module 24 may both output the blur-probable signal for external use and route the blur-probable signal within the camera module 24 for internal use.

"Real-time," as used in this specification and in the claims, refers to operations that are performed with respect to an external time frame. More specifically, real-time refers to an operation or operations that are performed at the same rate or faster than a process external to the machine or apparatus performing the operation. It should be appreciated that the methods and apparatus described in this specification for determining if first and second frames in a stream of frames are similar may be performed on a real-time basis.

It should also be appreciated that the methods and apparatus described in this specification for determining if first and second frames in a stream of frames are similar may be performed without the need to store the first and second frames in a memory. Because the various calculations described above may be performed on-the-fly, it is only necessary to provide registers (or other memory) to store block parameters calculated with respect to the first frame. It is not necessary that both the first and second frames be stored in memory at the same time. In other words, it is sufficient to provide a memory of a size to store only one frame. When the second frame is received, it may be stored in the memory overwriting first frame. This reduces memory requirements, reducing chip size and saving power. It is helpful but not critical that the registers for storing parameters of the second frame be provided.

In this document, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

In this document, the terms "average" or "averaged" are intended to include median and mode, as well as an arithmetic mean.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

I claim:

1. A method comprising:
   using a display controller to:
   (a) specify at least two sites in a frame, the sites being arranged in a particular spatial distribution, each site corresponding with the pixel locations of a block of pixels, each block having at least two pixels;
   (b) calculate a block parameter for each block of first and second frames in a sequence of frames, each block parameter being calculated from the pixels of a respective one of the blocks;
   (c) generate a block-pair similarity determination for each pair of spatially-corresponding pixel blocks of the first and second frames by determining whether there is a difference between the respective block parameters which is greater than a particular block-level threshold; and
   (d) generate a frame similarity determination by combining the block-pair similarity determinations to detect a camera shake when the first and second frames are not similar and to indicate a shake-free image is not probable, and to indicate a shake-free image is probable when the first and second frames are similar.

2. The method of claim 1, further comprising specifying nine regions by dividing the frame into three equal-width; vertical bands and three equal-height, horizontal bands, and setting each intersection of one of the vertical and one of the horizontal bands as one of the regions, wherein the particular spatial distribution situates one site in each of the nine regions.

3. The method of claim 1, further comprising specifying nine regions by dividing the frame into three equal-width, vertical bands and three equal-height, horizontal bands, and setting each intersection of one of the vertical and one of the horizontal bands as one of the regions, wherein a center region is specified by the intersection of a central vertical band and a central horizontal band, top-center and bottom-center regions are respectively specified by the intersections of the central vertical band and top and bottom horizontal bands, and left-center and right-center regions are respectively specified by the intersections of the central horizontal band and left and right vertical bands, wherein the particular spatial distribution situates at least two sites in the center region and one site in each of the top-center, bottom-center, left-center, and right-center regions.

4. The method of claim 1, further comprising specifying nine regions by dividing the frame into three equal-width, vertical bands and three equal-height, horizontal bands, and setting each intersection of one of the vertical and one of the horizontal bands as one of the regions, wherein a center region is specified by the intersection of a central vertical band and a central horizontal band, top-center and bottom-center regions are respectively specified by the intersections of the central vertical band and top and bottom horizontal bands, and left-center and right-center regions are respectively specified by the intersections of the central horizontal band and left and right vertical bands, wherein the particular spatial distribution situates one site in each of the center, top-center, bottom-center, left-center, and right-center regions, and one site centered at each four-corner junction where corners of four regions meet.

5. The method of claim 1, wherein each pixel is defined by at least two bits and the block parameters are calculated using fewer than all of the bits of each pixel.

6. The method of claim 5, further comprising specifying nine regions by dividing the frame into three equal-width, vertical bands and three equal-height, horizontal bands, and setting each intersection of one of the vertical and one of the horizontal bands as one of the regions, wherein the particular spatial distribution situates one site in each of the nine regions.

7. The method of claim 5, further comprising specifying nine regions by dividing the frame into three equal-width, vertical bands and three equal-height, horizontal bands, and setting each intersection of one of the vertical and one of the horizontal bands as one of the regions, wherein a center region is specified by the intersection of a central vertical band and a central horizontal band, top-center and bottom-center regions are respectively specified by the intersections of the central vertical band and top and bottom horizontal bands, and left-center and right-center regions are respectively specified by the intersections of the central horizontal band and left and right vertical bands, wherein the particular spatial distribution situates at least two sites in the center region and one site in each of the top-center, bottom-center, left-center, and right-center regions.

8. The method of claim 5, further comprising specifying nine regions by dividing the frame into three equal-width, vertical bands and three equal-height, horizontal bands, and setting each intersection of one of the vertical and one of the horizontal bands as one of the regions, wherein a center region is specified by the intersection of a central vertical band and a central horizontal band, top-center and bottom-center regions are respectively specified by the intersections of the central vertical band and top and bottom horizontal bands, and left-center and right-center regions are respectively specified by the intersections of the central horizontal band and left and right vertical bands, wherein the particular spatial distribution situates one site in each of the center, top-center, bottom-center, left-center, and right-center regions, and one site centered at each four-corner junction where corners of four regions meet.

9. The method of claim 1, wherein the particular block-level threshold used to generate a block-pair similarity determination for a first pair of spatially-corresponding blocks is distinct from the block-level threshold used to generate a block-pair similarity determination for a second pair of spatially-corresponding blocks.

10. The method of claim 1, wherein generating a frame similarity determination by combining block-pair similarity determinations includes assigning a first weight to a block-pair similarity determination for a first block pair and assigning a second weight to a block-pair similarity determination for a second block pair, the first and second weights being distinct.

11. The method of claim 1, further comprising rendering an indication corresponding with the frame similarity determination in a user-interface device.

12. The method of claim 1, further comprising storing a third frame in the sequence of frames in a nonvolatile memory if the frame similarity determination indicates that a shake-free image is probable.

13. The method of claim 1, further comprising storing the second frame in a nonvolatile memory if the frame similarity determination indicates that a shake-free image is probable.

14. A circuit coupled with a bus for transmitting frames of pixels, the circuit comprising:
  a first unit to sample a pixel transmitted on the bus if the coordinate location of the pixel is within one of at least two specified blocks of pixels of a frame, and to calculate a block parameter for each block from the sampled pixels, wherein each of the blocks is situated at a distinct site in the frame and the sites are arranged in a particular spatial distribution;
  a first memory to store the block parameters calculated for a first frame in a sequence of frames;
  a second unit to generate a block-pair similarity determination for each pair of spatially-corresponding pixel blocks of the first and a second frame in the sequence of frames; and
  a third unit to a generate frame similarity determination by combining the block-pair similarity determinations generated for the first and second frames to detect a camera shake when the first and second frames are not similar and to indicate a shake-free image is not probable, and to indicate a shake-free image is probable when the first and second frames are similar.

15. The circuit of claim 14, further comprising a second memory to store a frame of pixels and a fourth unit to control the storing of frames in the second memory, wherein when the fourth unit causes a third frame to be stored in the memory in response to a frame similarity determination which indicates that the first and second frames are similar.

16. The circuit of claim 14, further comprising a fifth unit to cause a user interface device to render an indication corresponding with the frame similarity determination.

17. The circuit of claim 14, wherein each pixel is defined by at least two bits and the block parameters are calculated using fewer than all of the bits of each pixel.

18. The circuit of claim 14, wherein frame similarity determinations are generated in real-time.

19. A system, comprising:
  a camera module to output pixels within specified pixel blocks, the specified pixel blocks being situated at distinct sites in a frame, the sites being arranged in a particular spatial distribution, the pixels corresponding with a particular capture event; and a display controller to (a) calculate a block parameter for each of the specified pixel blocks, (b) generate a block-pair similarity determination for each pair of spatially-corresponding pixel blocks of a first and a second set of pixel blocks, the first and second sets corresponding with first and second capture events, and (c) generate a frame similarity determination by combining the block-pair similarity determinations generated for the first and second sets of pixel blocks to detect a camera shake when the first and second frames are not similar and to indicate a shake-free image is not probable, and to indicate a shake-free image is probable when the first and second frames are similar.

20. The system of claim 19, wherein each pixel is defined by at least two bits and the block parameters are calculated using fewer than all of the bits of each pixel.

21. The system of claim 19, wherein, in response to a particular frame similarity determination, the display controller causes the camera module to output a frame, the frame corresponding with a third capture event.

22. The system of claim 21, further comprising a memory, wherein the display controller stores the frame corresponding with the third capture event in the memory.

23. The system of claim 19, further comprising a display device wherein, in response to a particular frame similarity determination, the display controller causes an indication to be rendered on the display device corresponding with the frame similarity determination.

24. The system of claim 21, wherein the camera module outputs a sequence of frames, each frame in the sequence corresponding with a particular capture event, and the pixels within the specified pixel blocks are included in the sequence of frames, and wherein the display controller identifies pixels within the specified pixel blocks for use in calculating the block parameters.

25. The system of claim 24, wherein, in response to a particular frame similarity determination, the display controller causes the camera module to output a frame, the frame corresponding with a third capture event.

26. The system of claim 25, further comprising a memory, wherein the display controller stores the frame corresponding with a third capture event in the memory.

27. The system of claim 24, wherein, in response to a particular frame similarity determination, the display controller causes the camera module to output a frame, the frame corresponding with the second capture event.

28. The system of claim 27, further comprising a memory, wherein the display controller stores the frame corresponding with the second capture event in the memory.

* * * * *